(12) United States Patent
Frost et al.

(10) Patent No.: US 10,864,991 B2
(45) Date of Patent: Dec. 15, 2020

(54) ADJUSTABLE CANTILEVERED TABLE ASSEMBLY

(71) Applicant: B/E Aerospace, Inc., Winston-Salem, NC (US)

(72) Inventors: Ian L. Frost, Winston-Salem, NC (US); John R. Kuyper, Winston-Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 1 day.

(21) Appl. No.: 16/359,130

(22) Filed: Mar. 20, 2019

(65) Prior Publication Data

US 2020/0298977 A1 Sep. 24, 2020

(51) Int. Cl.
*B64D 11/06* (2006.01)
*A47B 1/08* (2006.01)

(52) U.S. Cl.
CPC ............ *B64D 11/0638* (2014.12); *A47B 1/08* (2013.01)

(58) Field of Classification Search
CPC ... B64D 11/0605; B64D 11/0638; A47B 1/08; A47B 3/14
See application file for complete search history.

(56) References Cited

U.S. PATENT DOCUMENTS

| | | | |
|---|---|---|---|
| 4,281,874 A | 8/1981 | Iwans et al. | |
| D311,829 S | 11/1990 | Vossoughi | |
| 5,177,616 A * | 1/1993 | Riday | B64D 11/0627 348/837 |
| 5,547,247 A | 8/1996 | Dixon | |
| 5,996,954 A * | 12/1999 | Rosen | B64D 11/00153 248/278.1 |
| 6,347,590 B1 | 2/2002 | D'annunzio et al. | |
| 6,427,957 B1 * | 8/2002 | Finneman | B60N 3/002 248/185.1 |
| 8,322,670 B2 * | 12/2012 | Westerink | B64D 11/0015 16/363 |
| 8,985,684 B2 * | 3/2015 | Zheng | B64D 11/00 297/161 |
| 9,481,464 B2 * | 11/2016 | Gow | B64D 11/0605 |
| 9,573,687 B2 | 2/2017 | Stephens et al. | |
| 9,617,001 B2 * | 4/2017 | Zimmermann | B64D 11/00153 |
| 9,989,191 B2 * | 6/2018 | Parker | B60R 11/0235 |
| 2010/0275821 A1 | 11/2010 | Lebel et al. | |
| 2011/0147546 A1 * | 6/2011 | Monsalve | F16M 11/2092 248/122.1 |

* cited by examiner

*Primary Examiner* — Philip F Gabler
(74) *Attorney, Agent, or Firm* — Suiter Swantz pc llo

(57) ABSTRACT

A table assembly including a first arm attachable to a fixed structure, a second arm pivotally attached to the first arm, a third arm is pivotally attached to the second arm, and a table attached to the third arm. The second arm is configured to maintain the first arm and the third arm parallel as the first arm and the third arm pivot simultaneously relative to the second arm. The second arm includes a tension member configured to transfer tension along the second arm from the first arm to the third arm as the first arm and third arm pivot simultaneously relative to the second arm. The tension member may be further configured to transfer compression along the second arm from the third arm to the first arm as the first arm and third arm pivot simultaneously relative to the second arm.

16 Claims, 9 Drawing Sheets

ADJUSTABLE CANTILEVERED TABLE ASSEMBLY

BACKGROUND

Passenger cabin space and the comfort and convenience of passengers are highly important aspects of airline travel. Seeking every advantage in a competitive market, aircraft operators want to maximize the number of seats available to customers, improve access to each seat, and provide passengers with amenities that facilitate in-flight dining and the use of computing devices such as laptops and electronic tablets.

Aircraft passenger seats are commonly equipped with tray tables that deploy from the backs of the seats of one seating row for use by passengers in seats in a next parallel row. Angled seating arrangements, in which passengers can comfortably recline, are available in some aircraft, allowing each customer more leg room and more generally forward space than provided in traditional parallel row seating arrangements. Such non-traditional seating arrangements may not have the back of a more forward seat accessible to a passenger in a next seat.

Accordingly, improvements are needed in arrangements for variably supporting tray tables in vehicle cabin environments.

SUMMARY OF THE INVENTIVE ASPECTS

To achieve the foregoing and other advantages, certain inventive aspects disclosed herein are directed to table assemblies including a jointed arm assembly in which a first arm is attachable to a fixed structure, a second arm is pivotally is attached to the first arm, a third arm is pivotally attached to the second arm, and a table is attached to the third arm. The second arm is configured to maintain the first arm and the third arm parallel, or at least a maintain a longitudinal axis of each of the first arm and the third arm parallel, as the first arm and third arm pivot simultaneously relative to the second arm to raise or lower the table.

In some embodiments, the second arm may include a tension member configured to transfer tension along the second arm from the first arm to the third arm as the first arm and third arm pivot simultaneously relative to the second arm.

In some embodiments, the second arm may include a compression member configured to transfer compression along the second arm from the first arm to the third arm as the first arm and third arm pivot simultaneously relative to the second arm.

In some embodiments, the second arm may further include a side frame pivotally attached to the first arm and pivotally attached to the second arm, and the tension member may move linearly relative to the side frame when the first arm and the third arm pivot simultaneously relative to the second arm.

In some embodiments, the second arm may further include a compression member configured to transfer compression along the second arm from the first arm to the third arm as the first arm and third arm pivot simultaneously relative to the second arm, and the compression member may move linearly relative to the side frame when the first arm and the third arm pivot simultaneously relative to the second arm.

In some embodiments, the tension member and the compression member may move linearly, relative to the side frame, in opposite directions simultaneously when the first arm and the third arm pivot simultaneously relative to the second arm.

In some embodiments, the tension member may be further configured to transfer compression along the second arm from the third arm to the first arm as the first arm and third arm pivot simultaneously relative to the second arm.

In some embodiments, the tension member may include a first contact surface engaging the first arm and a second contact surface facing the first contact surface and engaging the second arm.

In some embodiments, the first and second contact surfaces may be involute.

In some embodiments, the first arm may include a first rail engaging the first contact surface, the second arm may include a second rail engaging the second contact surface, and the first rail and the second rail may be trapped between the first contact surface and the second contact surface.

The foregoing embodiments may be exemplified in an aircraft passenger seat assembly, in which the first arm is attached to a passenger seat.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated, and some features may be omitted or may be represented schematically in the interest of clarity. Like reference numbers in the drawings may represent and refer to the same or similar element, feature, or function. In the drawings.

DETAILED DESCRIPTION

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities. The aspects, features and functions described below in connection with one embodiment are intended to be applicable to the other embodiments described below except where expressly stated or where an aspect, feature or function is incompatible with an embodiment.

Figure 1:
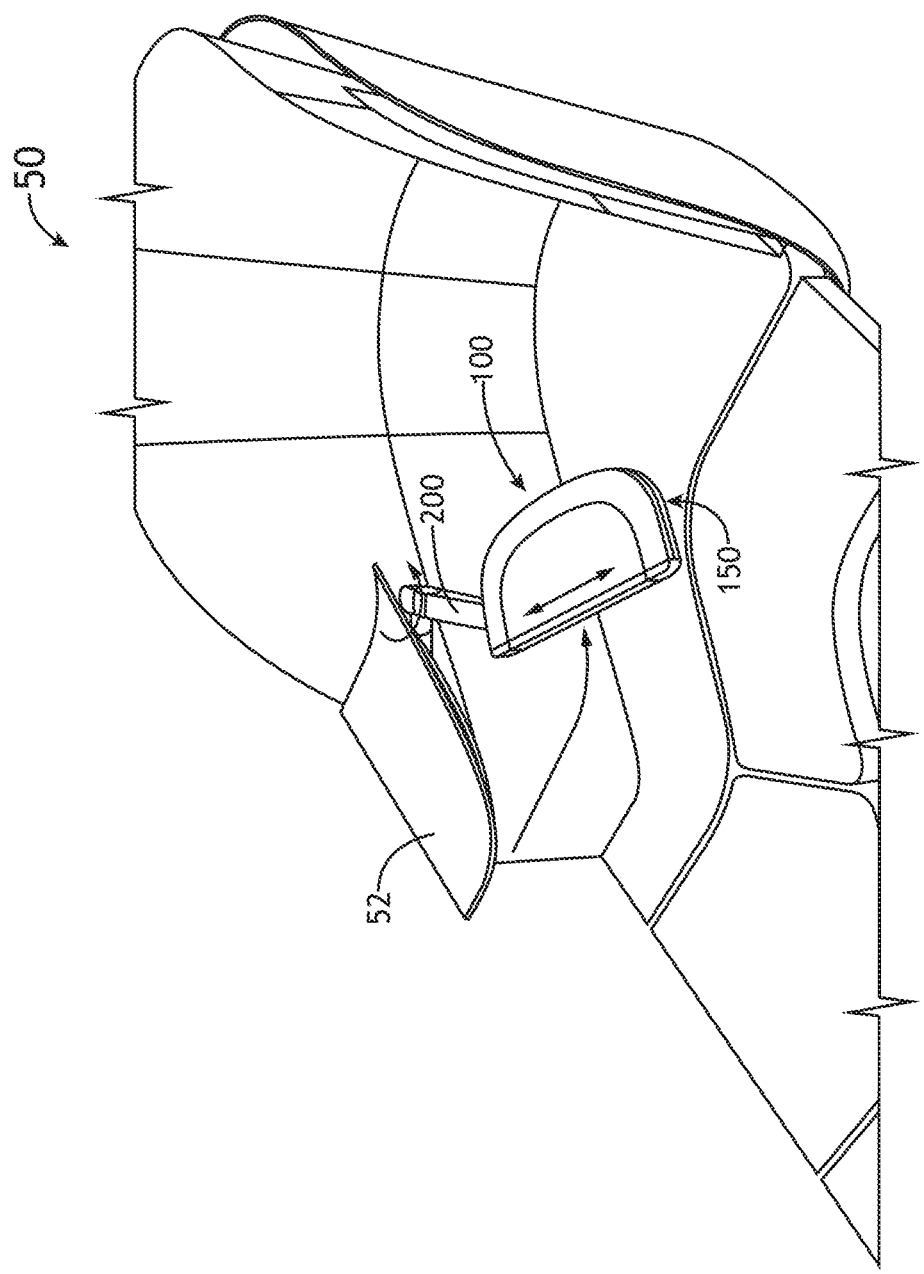
FIG. 1 is a perspective view of a passenger seat including an adjustable table assembly according to the present disclosure.
Figure 2:
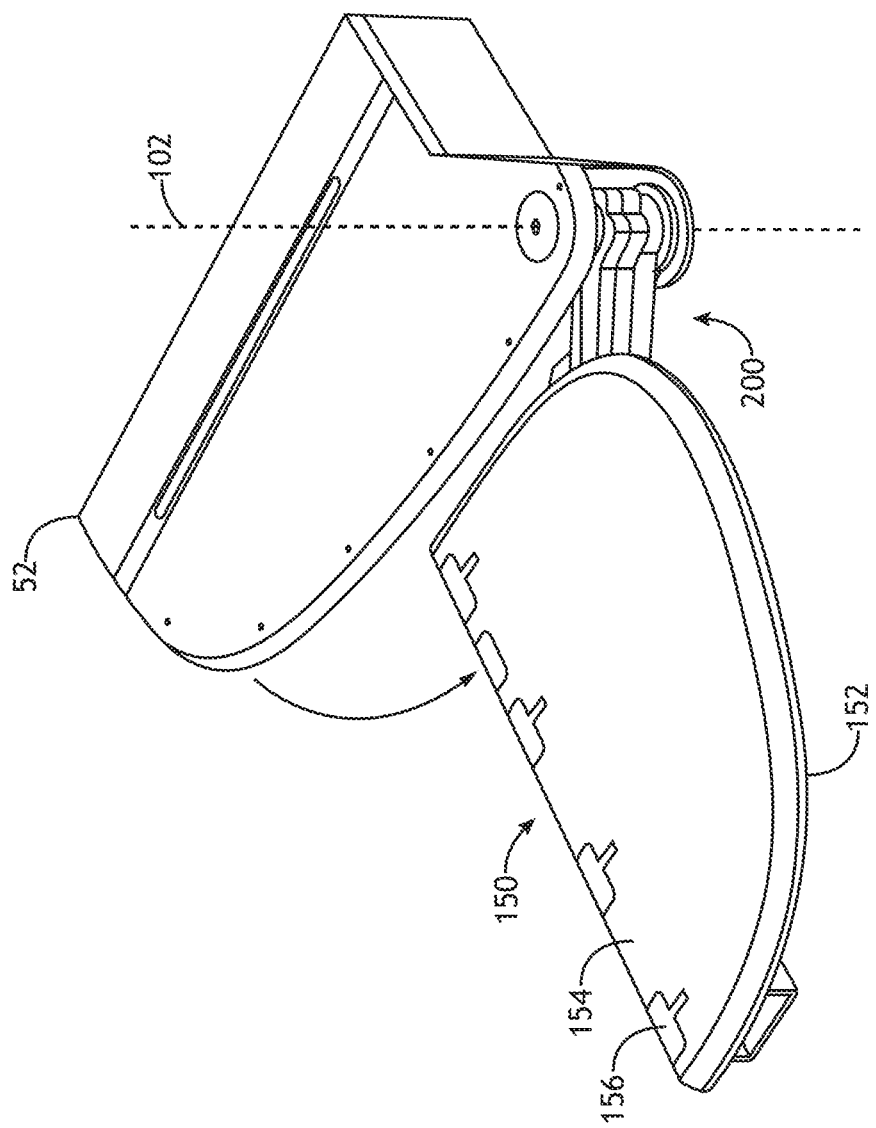
FIG. 2 is a perspective view of the adjustable table assembly of FIG. 1.
Figure 3:
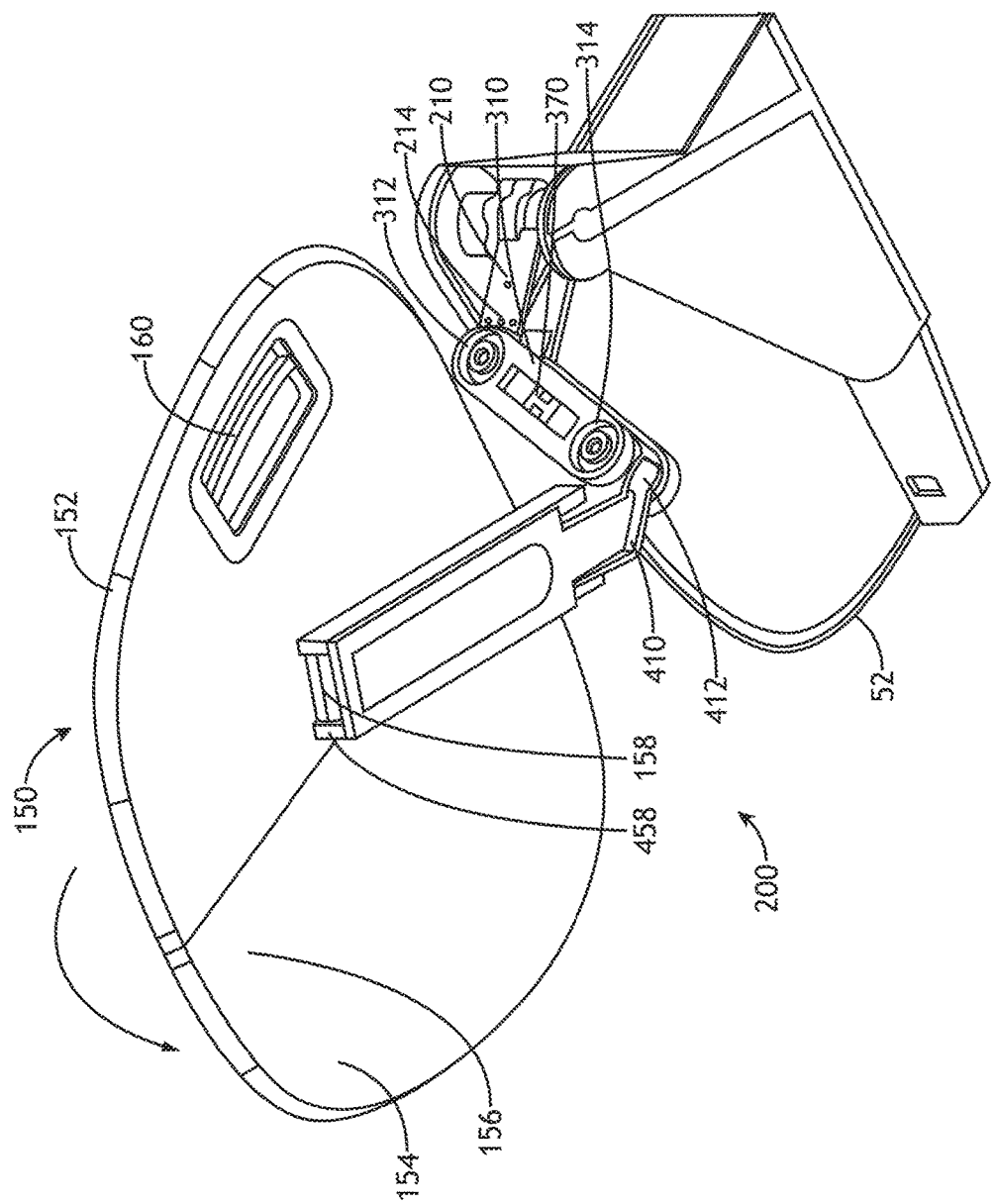
FIG. 3 is a perspective view of the adjustable table assembly of FIG. 2 with the table shown in a lowered position.

Referring to FIG. 1, a non-limiting example of an adjustable table assembly 100 is shown including a table 150 and a jointed arm mechanism 200 that adjustably supports the table 150 generally in a horizontal disposition for convenient use. The table assembly 100 is attachable, for example, to the side of a seat 50 or other fixed structure. The table 150 can be swung outward as shown in FIG. 2 from a stowed position under a base 52 that remains stationary with the seat 50. The table 150 is initially deployed from the stowed position in a folded configuration, in which a first table section 152 and a second table section 154 are compactly folded together. As shown in FIG. 3, once the table 150 has cleared the base 52, the second table section 154, which is connected to the first table section 152 by a hinge 156, can be pivoted around the hinge 156 to establish the table 150 in its unfolded configuration.

The jointed arm mechanism 200 supports the table 150 and permits movement of the table 150 to be lowered and positioned for passenger convenience and use. The jointed arm mechanism 200 includes a first or upper arm 210, a second or center arm 310, and a third or lower arm 410. The jointed arm mechanism 200 is pivotally attached to the side structure of the seat 50 by way of the upper arm 210, which is rotatable around a fixed vertical axis 102 (FIG. 2) at its attached end permitting deployment of the table 150 from the stowed position to an area generally forward of a seated passenger. The jointed arm mechanism 200 supports the table 150 in a cantilevered fashion in that the center arm 310, the lower arm 410 and the table 150 are entirely supported by the upper arm 210 when the adjustable table assembly 100 is deployed beyond the stowed position.

In typical use, the table 150 is adjustably lowered, according to passenger preference, to a vertical height below that of the upper arm 210. The arm sections 210, 310 and 410 are thus respectively referenced as upper, center and lower for nominal purposes. Other features of the arm mechanism 200 are similarly referenced in the following without requiring or even implying that a feature described as upper is vertically higher than another feature referenced as lower in any given position of the jointed arm mechanism. The terms forward and rearward are similarly used in the following, with forward directions and features along the jointed arm mechanism 200 being toward the lower arm 410 or table 150, and rearward directions and features being toward the upper arm 210, seat 50, or other fixed structure upon which the upper arm 210 is attached.

The upper arm 210 has a rearward end 212 (FIG. 3) pivotally attached to the side structure of the seat 50. As the rearward end 212 of the upper arm 210 rotates by passenger adjustment around the fixed vertical axis 102 (FIG. 2), the upper arm 210 is maintained as generally horizontal, and the forward end 214 of the upper arm 210 travels along a horizontal circular arc.

A rearward end 312 of the center arm 310 is pivotally attached to the forward end 214 of the upper arm 210. The center arm 310 can rotate around horizontal axle posts 222 (FIG. 5) at the forward end 214 of the upper arm 210, permitting a forward end 314 of the of the center arm 310 to be lowered and raised.

The table 150 is slidably attached to the lower arm 410. In the illustrated example of FIG. 3, a linear bearing or other sliding mount 158 is connected to the lower side of the first table section 152, and a lower arm rail 458 is attached to the lower arm 410 permitting the table 150 to slide linearly relative to the lower arm 410. To conserve space, the table 150 overhangs the center arm 310 when the adjustable table assembly 100 is in the stowed configuration, preventing the center arm from pivoting below horizontal. In FIG. 3, the table 150 is extended forward along the lower arm rail 458 relative to the lower arm 410, permitting the center arm 310 to pivot and lower the table 150.

Figure 4:
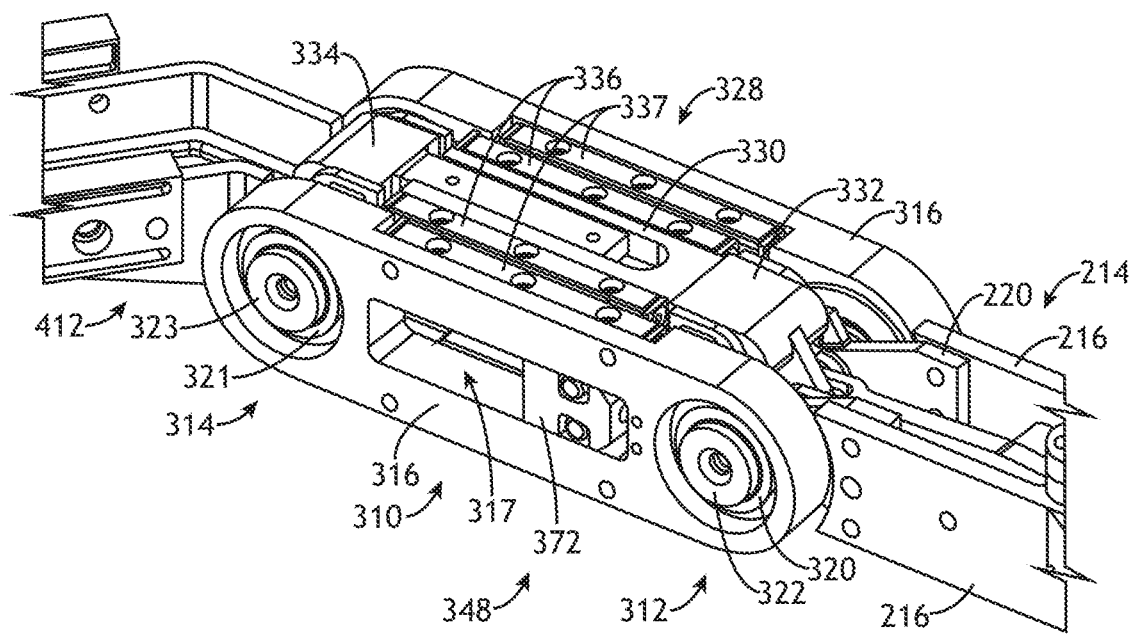
FIG. 4 is a perspective view of central parts of a jointed arm mechanism according to the present disclosure.

As shown in FIG. 4, the forward end 214 of the upper arm carries a pair of upper arm fork plates 216 between which an upper arm pinion 220 is fixed. A respective axle post 222, one of which is visible in FIG. 5, extends horizontally from each of two lateral sides of the upper arm pinion 220. At each lateral side of the rearward end 312 of the center arm 310, a respective longitudinally extending side frame 316 of the center arm 310 is pivotally mounted on each axle post 222 (FIG. 5) by a bearing 320 (FIG. 4) with a bearing cap 322. A bore of each axle post 222 may be internally threaded, for example, to retain a cap screw or other fastener so as to attach the center arm side frame 316, bearing 320, and bearing cap 322 to the upper arm pinion 220. A center frame 318 spans the lateral space between and interconnects the side frames 316.

Figure 5:
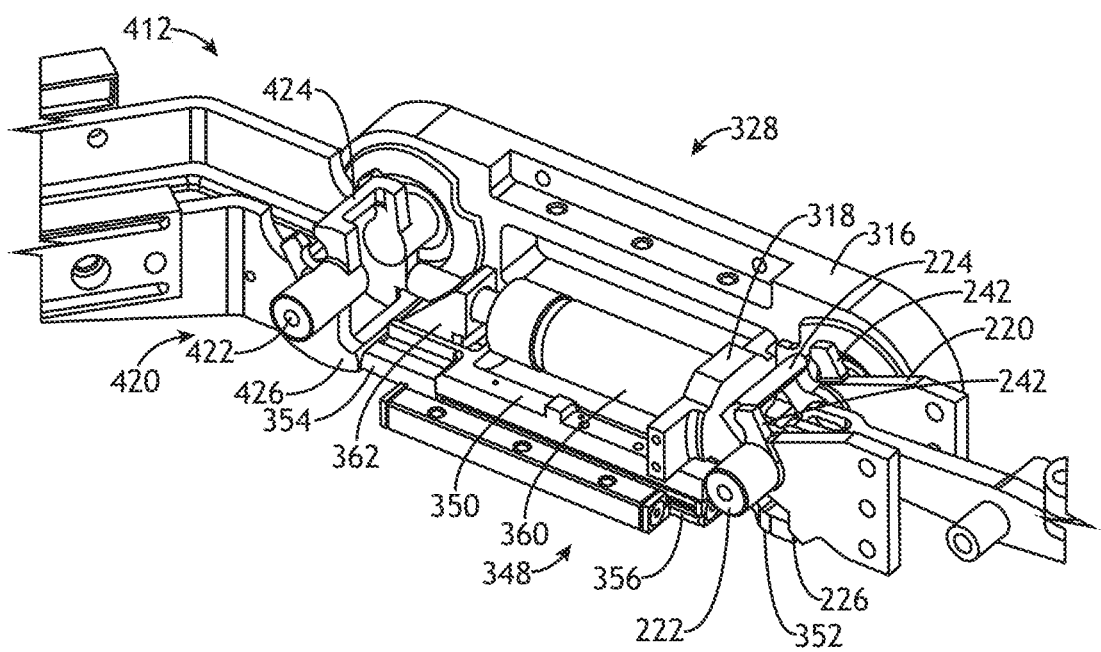
FIG. 5 is a perspective view of some components of the jointed arm mechanism of FIG. 4, shown in a state of partial assembly.

The rearward end 412 of the lower arm has a lower arm pinion 420 from which a respective axle post 422, one of which is visible in FIG. 5, extends horizontally from each of two lateral sides. Each side frame 316 of the center arm 310 has a forward end pivotally mounted on a respective axle post 422 (FIG. 5) by a bearing 321 with a bearing cap 323 (FIG. 4).

As the forward end 314 of the center arm 310 is lowered and raised, the lower arm 410 and the table 150 are advantageously maintained as generally horizontal by mechanical features of the center arm 310 that engage the upper arm pinion 220 and lower arm pinion 420. A typically upward and forward-facing side of the center arm 310, with respect to the perspective of a seated passenger, is referenced herein as a dorsal side 328 of the center arm 310. An oppositely facing side of the center arm 310 is referenced as the ventral side 348.

Figure 11:
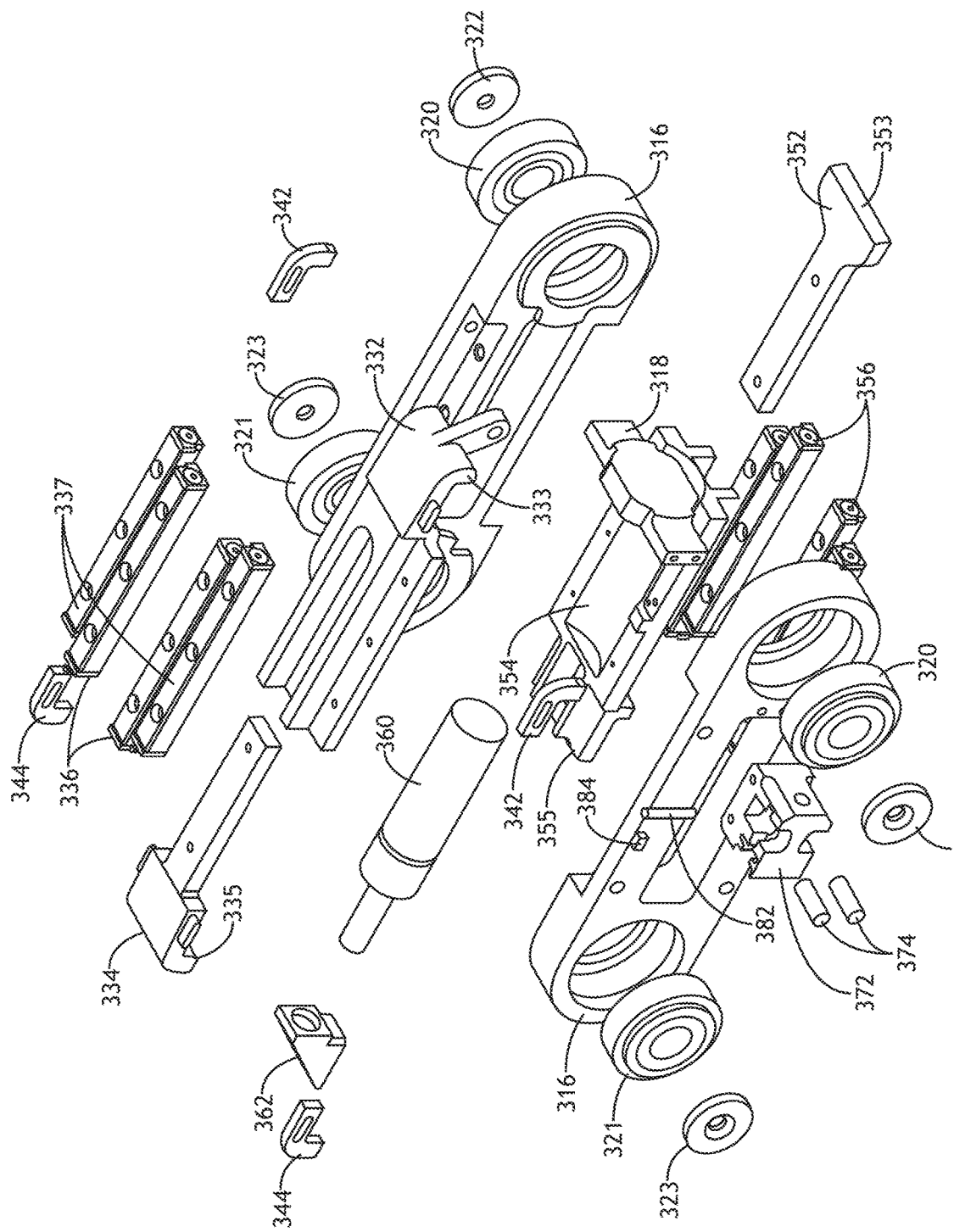
FIG. 11 is an exploded perspective view of the center arm section of the jointed arm mechanism of FIG. 4.

Along the dorsal side 328 (FIG. 4) of the center arm 310, a tension member 330 has an upper tension link 332 and a lower tension link 334, which are shown in FIG. 11 as separable for disassembly, assembly, and adjustment. The upper tension link 332 engages the upper arm pinion 220 and the lower tension link 334 engages the lower arm pinion 420 (FIG. 5). In particular, the upper tension link 332 has an involute contact surface 333 (FIG. 11) that engages a corresponding laterally extending tension rail 224 (FIG. 5) of the upper arm pinion 220. Similarly, the lower tension link 334 has an involute contact surface 335 (FIG. 11) that engages a laterally extending tension rail 424 (FIG. 5) of the lower arm pinion 420. Thus, the tension rail of the upper arm pinion 220 and the tension rail of the lower arm pinion 420 are trapped between the involute contact surface 333 of the upper tension link 332 and the involute contact surface 335 of the lower tension link 334. Accordingly, the tension member 330 transfers tension forces along the dorsal side 328 of the center arm 310 between the upper arm pinion 220 and the lower arm pinion 420. In cooperation with other mechanical features of the center arm 310, the tension member 330 thereby helps to maintain the lower arm 410 and the table 150 as generally horizontal as a passenger adjusts the table assembly 100.

A contact surface described as involute refers to a contact surface shaped to engage or abut another with mechanical efficiency and minimal wear when parts move relative to each other. For example, interacting spur gears typically have involute contact surfaces that permit efficient contact and motion.

Along the ventral side 348 (FIG. 4) of the center arm 310, a compression member 350 has an upper compression link 352 and a lower compression link 354, which are shown in FIG. 11 as separable for disassembly, assembly, and adjustment. The upper compression link 352 engages the upper arm pinion 220 and the lower compression link 354 engages the lower arm pinion 420. In particular, the upper compression link 352 has a laterally extending involute contact surface 353 (FIG. 11) that engages a corresponding compression abutment 226 (FIG. 5) at each of two lateral sides of the upper arm pinion 220, one of which abutments is visible in FIG. 5. Similarly, the lower compression link 354 has an involute contact surface 355 that engages a corresponding laterally extending compression rail 426 (FIG. 5) of the lower arm pinion 420. Thus, the compression member 350 is trapped between the compression abutments 226 of the upper arm pinion 220 and the compression rail 426 of the lower arm pinion 420. Accordingly, the compression member 350 transfers compression forces along the ventral side 348 of the center arm 310 between the upper arm pinion 220 and lower pinion 420. In cooperation with other mechanical features of the center arm 310, the compression member 350 thereby helps to maintain the lower arm 410 and the table 150 as generally horizontal as a passenger adjusts the table assembly 100.

Figure 8:
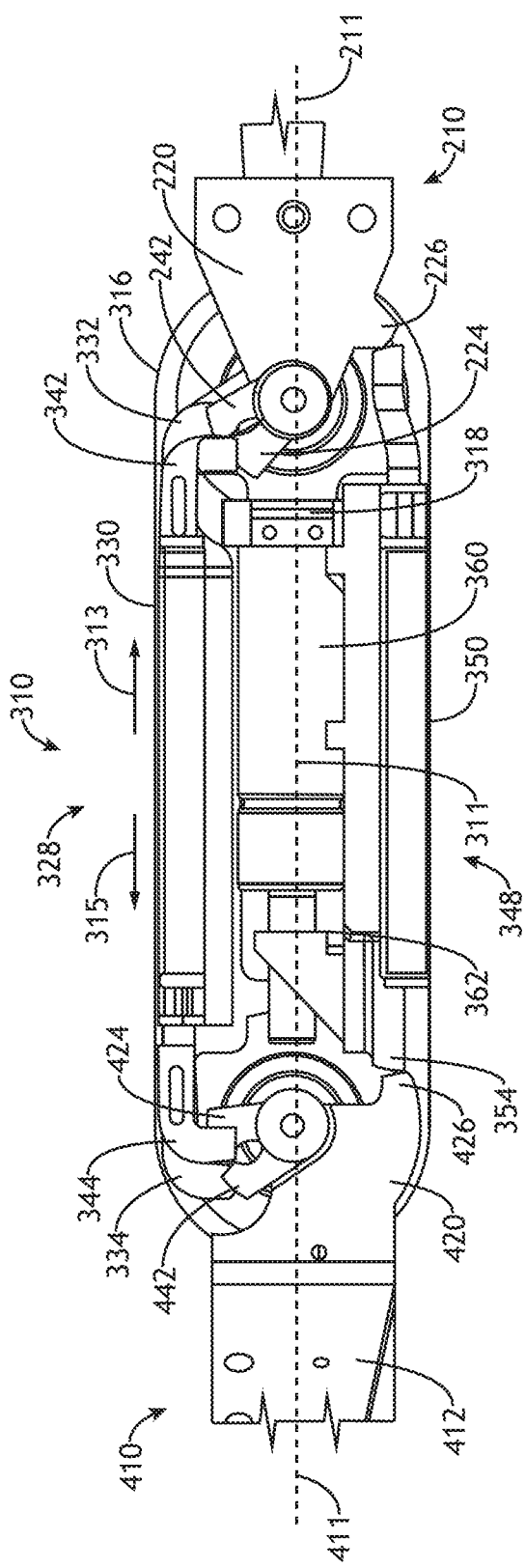
FIG. 8 is a side view of the jointed arm mechanism of FIG. 7 further partially assembled, shown with arm sections thereof in a raised condition.

By way of reverse splines, the tension member 330 also transfers compression forces between the upper arm pinion 220 and lower arm pinion 420. In particular, as shown in FIG. 8, two upper reverse splines 342 are respectively attached to the two lateral sides of the upper tension link 332. The upper arm pinion 220 has two correspondingly laterally spaced compression teeth 242 that engage the two upper reverse splines 342. Furthermore, two lower reverse splines 344 are respectively attached to the two lateral sides of the lower tension link 334. The lower arm pinion 420 has two correspondingly laterally spaced compression teeth 442 that engage the two lower reverse splines 344. Thus, the tension member 330 is trapped between the compression teeth 242 of the upper arm pinion 220 and the compression teeth 442 of the lower arm pinion 420. Accordingly, the tension member 330 transfers compression forces along the dorsal side 328 of the center arm between the upper arm pinion 220 and lower pinion 420. In cooperation with other mechanical features of the center arm 310, the tension member 330 thereby helps to maintain the lower arm 410 and the table 150 as generally horizontal as a passenger adjusts the table assembly 100.

The tension member 330 and the compression member 350 are longitudinally movable relative to the side frames 316 to permit the center arm 310 to pivot relative to the forward end 214 of the upper arm 210. Along the dorsal side of the center arm 310, two linear bearing rails 336 (FIG. 5) are respectively attached to the two outer lateral sides of the upper tension link 332. Two corresponding laterally spaced linear bearing rails 337 are respectively attached to the laterally inward sides of the side frames to engage the linear bearing rails 336 attached the upper tension link 332. The ventral side 348 of the center arm has similar linear bearing rails, with a linear bearing rails mounted on the side frame 316, and linear bearing rails 356 mounted on the lower compression link 354, a corresponding set of which is visible in FIG. 5.

Figure 6:
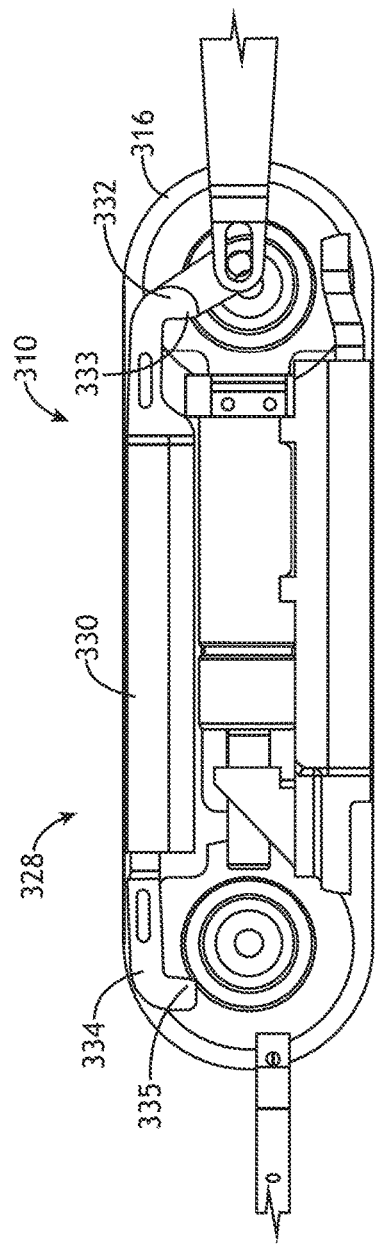
FIG. 6 is a side view of some components of the jointed arm mechanism of FIG. 4, shown in another state of partial assembly.
Figure 7:
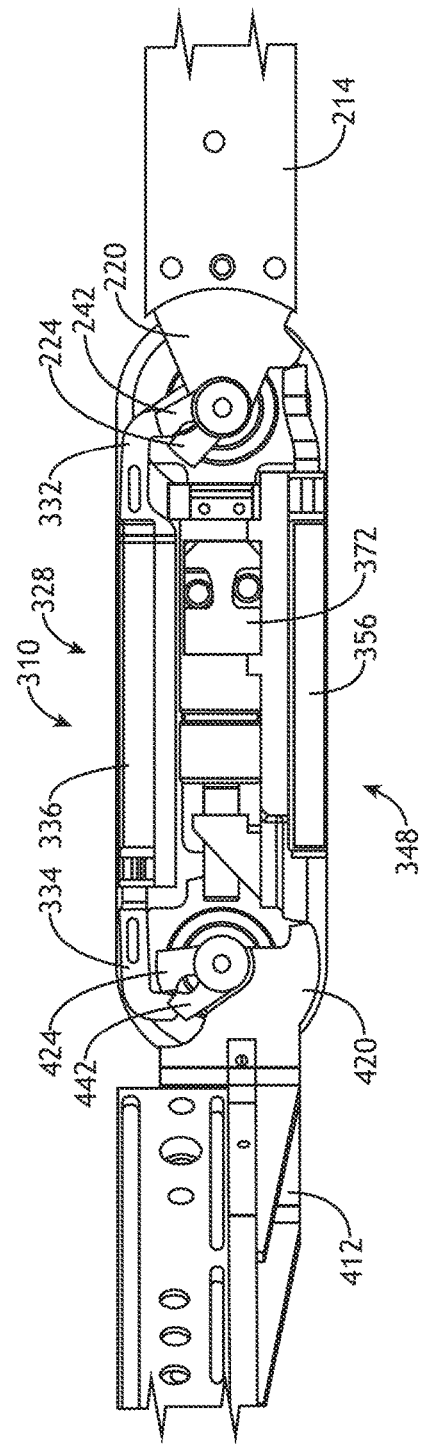
FIG. 7 is a side view of the jointed arm mechanism of FIG. 6, further partially assembled.

FIGS. 6-9 further illustrate the center arm 310 in stages of assembly to permit views of features occluded for example in FIG. 4. In FIG. 6, the involute contact surface 333 of the upper tension link 332 is shown as facing the opposing involute contact surface 335 of the lower tension link 334 defining a space therebetween. The upper arm pinion 220 is shown in FIG. 7 attached to the rearward end the center arm 310, with the involute contact surface of the upper tension link 332 hidden from view by the compression tooth 242 of the upper arm pinion 220 in the foreground. The lower arm pinion 420 is similarly shown, with the involute contact surface of the lower tension link 334 hidden from view by a compression tooth 442 of the lower arm pinion 420 in the foreground. Linear bearing rails 336 and 356 are also additionally shown in FIG. 7.

In FIG. 8, an upper reverse spline 342 is attached to the upper tension link 332 to engage the compression tooth 242 of the upper arm pinion 220. Similarly, a lower reverse spline 344 is attached to the lower tension link 334 to engage the compression tooth 442 of the lower arm pinion 420. FIG. 8 thus illustrates the tension rail 224 of the upper arm pinion 220 and the tension rail 424 of the lower arm pinion 420 as trapped between the involute contact surface of the upper tension link 332 and the involute contact surface of the lower tension link 334 so as to transfer tension forces along the dorsal side 328 of the center arm 310. FIG. 8 further illustrates the reverse splines 342 and 344 and the tension member 330 as trapped between the compression teeth 242 and 442 of the upper and lower arm pinions (220, 420) so as to transfer compression forces along the dorsal side 328 of the center arm. FIG. 8 further illustrates the compression member 350 as trapped between the compression abutments 226 of the upper arm pinion 220 and the compression rail 426 of the lower arm pinion 420 so as to transfer compression along the ventral side 348 of the center arm.

The member 330 where tension may occur is termed herein as a tension member for nominal purposes. The member 350 where compression may occur as tension may occur and compression is expected in the compression member 350 due at least to the weights of the center arm 310 and lower arm 410. These expected forces are expected to increase or at least vary in normal use as a passenger places objects upon the table 150. It should be understood that, also in normal use, a passenger adjusting the position of the table 150 and arm mechanism 200 applies momentary or sustained forces in various directions, causing varying forces to be applied to the jointed arm mechanism 200, which nonetheless maintains the lower arm 410 and the table 150 as generally horizontal.

Figure 9:
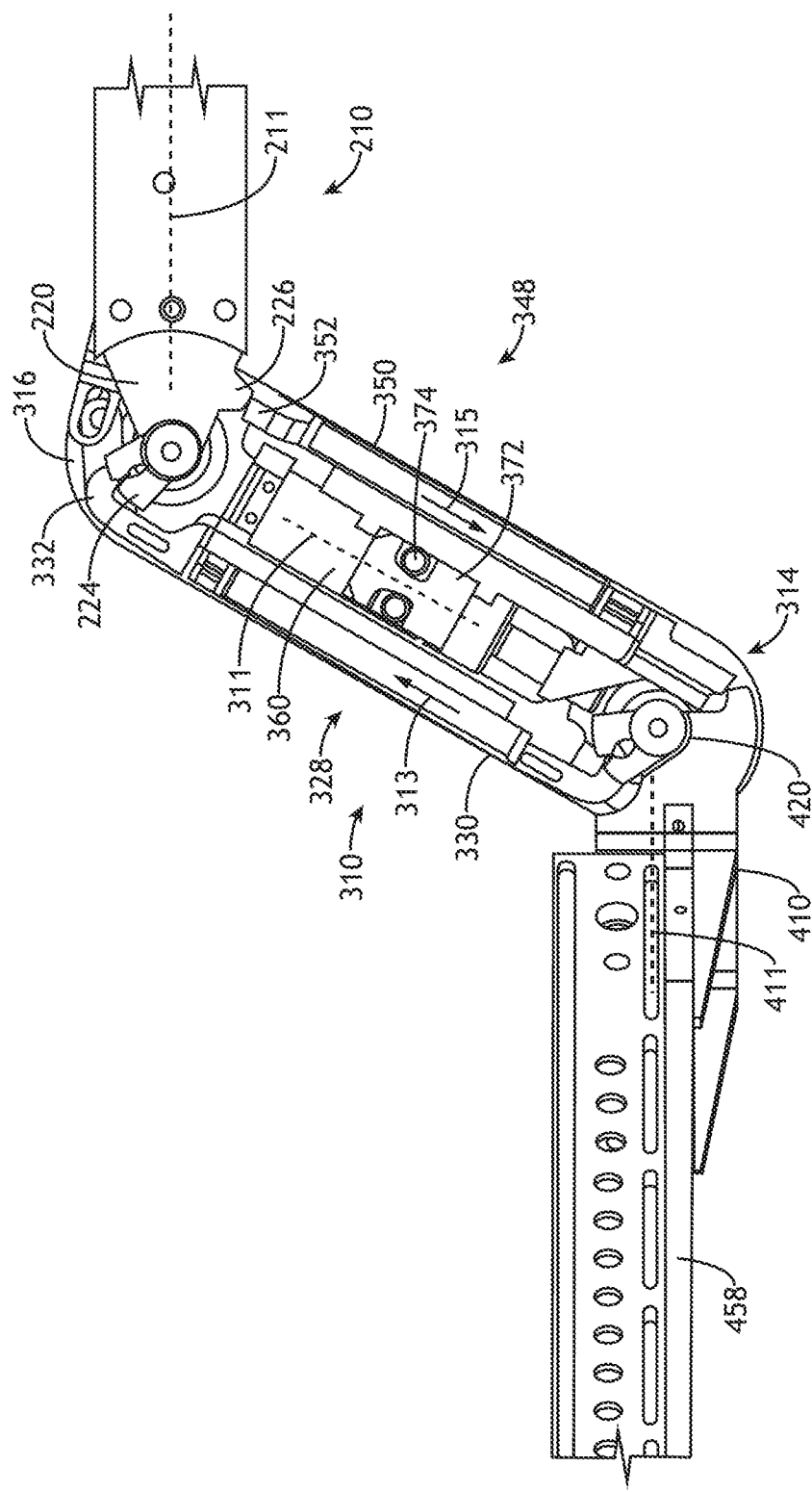
FIG. 9 is a side view of the jointed arm mechanism of FIG. 7, shown with arm sections thereof in a lowered condition.

FIGS. 8 and 9 together illustrate relative movements of the components of the center arm and linked components of the upper arm 210 and lower arm 410. Note that the upper and lower reverse splines shown in FIG. 8 are not shown in FIG. 9. Note also that a counter balance shown in FIGS. 5-9, and a brake shown in several drawings including FIG. 9, will be explained in descriptions that follow.

In FIG. 8, the longitudinal axis 311 of the center arm, and the longitudinal axis 411 of the lower arm are shown as extending along the longitudinal axis 211 of the upper arm, which may be horizontal in typical use according to the upper arm 210 being pivotally attached to a seat or other fixed structure in a horizontal disposition. Thus, the longitudinal axes referenced in FIG. 8 are considered here as horizontal. In any scenario in which the longitudinal axis 211 of the upper arm is not horizontal, the longitudinal axis 411 of the lower arm will follow accordingly, remaining parallel to the longitudinal axis 211 of the upper arm. The upper arm pinion 220, including the upper tension rail 224, the upper compression tooth 242, and the upper compression abutment 226 are considered as stationary in FIGS. 8 and 9.

In FIG. 9, the center arm 310 is pivoted to a declined position relative to FIG. 8, and the lower arm 410 is lowered in FIG. 9 accordingly. Along the dorsal side 328 of the center arm, as the center arm 310 is pivoted downward and the upper tension rail 224 applies tension to the upper tension link 332, the tension member 330 moves in a rearward linear direction 313 relative to the side frames 316 and parallel to the downward pivoting longitudinal axis 311. Along the ventral side 348 of the center arm 310, as the center arm 310 is pivoted downward and the upper compression abutment 226 applies compression to the upper compression link 352, the compression member 350 moves in a forward linear direction 315 relative to the side frames 316 and parallel to the downward pivoting longitudinal axis 311. The forward direction 315 is opposite the rearward direction 313, both of which are parallel to the longitudinal axis 311 along which the side frames 316 extend.

Accordingly, at the forward end 314 of the center arm 310, as the center arm 310 is pivoted to the declined position of FIG. 9, forces are applied to the lower arm pinion 420 to maintain its orientation as fixed relative to the upper arm pinion 220 thereby maintaining the longitudinal axis 411 of the lower arm 410 as parallel to the longitudinal axis 211 of the upper arm 210 as the angle of the center arm 310 varies. In particular, the lower tension link 334 applies tension to the tension rail 424 of the lower arm pinion 420, and the lower compression link 354 applies compression to the lower compression rail 426.

The upper and lower reverse splines (342, 344) (FIG. 8), in cooperation with the upper and lower tension links (332, 334), maintain positive engagement of the tension member 330 with the upper and lower arm pinions (220, 420), particularly for example when the center arm is returned to a more horizontal position (FIG. 8) from a declined position (FIG. 9). As the declined center arm 310 is pivoted to the horizontal position of FIG. 8, the dorsal side tension member 330 bears compression from the compression teeth 242 of the upper arm pinion 220 to the compression teeth 442 of the lower arm pinion 420. Accordingly, the tension member 330 is moved in the forward direction 315 with respect to the longitudinal axis 311 of the center arm, and the lower arm pinion 420 is thereby rotated relative to the rising longitudinal axis 311 in coordination with the upper arm pinion 220, maintaining the orientation of the lower arm pinion 420 as fixed relative to the upper arm pinion 220 and maintaining the longitudinal axis 411 of the lower arm as parallel to the longitudinal axis 211 of the upper arm as the angle of the center arm varies.

In the rotating frame of reference of the pivoting center arm 310, the upper arm 210 and lower arm 410 are maintained as parallel, by mechanical features of the center arm 310, as they pivot simultaneously in a same rotational direction relative to the side frames 316 of the center arm 310. Furthermore, in the rotating frame of reference of the pivoting center arm 310, the tension member 330 and the compression member 350 translate simultaneously in opposing linear directions relative to the side frames 316 as the upper arm 210 and lower arm 410 pivot simultaneously in a same rotational direction relative to the side frames 316 of the center arm 310.

Due to positive engagement of the tension member 330 with the upper and lower arm pinions (220, 420), according to the function of the upper and lower reverse splines (342, 344) (FIG. 8) in cooperation with the upper and lower tension links (332, 334), the tension member 330 and compression member 350 perform as opposing parallel orientable arms in a 4-bar system, with the upper arm pinion 220 and lower arm pinion 420 performing as opposing static arms linking the orientable arms.

The lower-arm longitudinal axis 411 refers to that portion of the lower arm 410 attached to the center arm 310 and extending therefrom parallel to the upper-arm longitudinal axis 211. In the illustrated embodiment, the lower arm rail 458, by which the table 150 (FIG. 3) is slidably attached to the lower arm 410, extends at an angle relative to the lower-arm longitudinal axis 411 of FIG. 11. The illustrated embodiment may be preferred when the table assembly 100 is attached to the right side of a seat 50 relative to a passenger. In a corresponding embodiment for attaching to the left side of a seat, the lower arm rail 458 may extend from the lower-arm longitudinal axis 411 at an angle opposite that shown in FIG. 3. In either such embodiment, longitudinal axis 411 and the lower arm rail 458 are horizontal, assuring that the table 150 is maintained as horizontal even with linear movement along the lower arm rail 458.

A counter balance 360, shown in FIGS. 5-9, applies a force to help a passenger adjust the table 150 (FIG. 3) supported by the lower arm 410 to a desired height. A rearward end of the counterbalance 360 abuts the center frame 318 and is fixed relative to the side frames 316. A forward end of the counterbalance is biased forward and engages a counter balance stop 362 attached to the compression member 350. The compression member 350 is thus persistently biased in the forward direction by forces applied to the counterbalance stop. The counterbalance is illustrated as a rearward gas cylinder abutting the center frame 318 and a rod biased forward to apply force upon the counterbalance stop 362. Other embodiments of the counterbalance may be driven by a spring. By biasing the compression member 350 in the forward direction 315, the counter balance 360 biases the center arm 310 toward the declined position of FIG. 9 from the horizontal position of FIG. 8.

A brake 370 (FIG. 10) is operable by a passenger to release the center arm 310 for movement when the vertical position of the table 150 is to be adjusted. A brake block 372 (FIG. 4) is attached to the lower compression link 354 (FIG. 5) and travels longitudinally with movements of the compression member 350 relative to the side frames 316 as the center arm 310 is declined from the horizontal position of FIG. 8 or is returned thereto. The brake block 372 extends from a lateral side of the lower compression link 354 into a longitudinally extending slot 317 (FIG. 4) defined by the side frame 316. As the compression member 350 moves relative to the side frame 316, the brake block 372 moves longitudinally within the slot 317.

Figure 10:
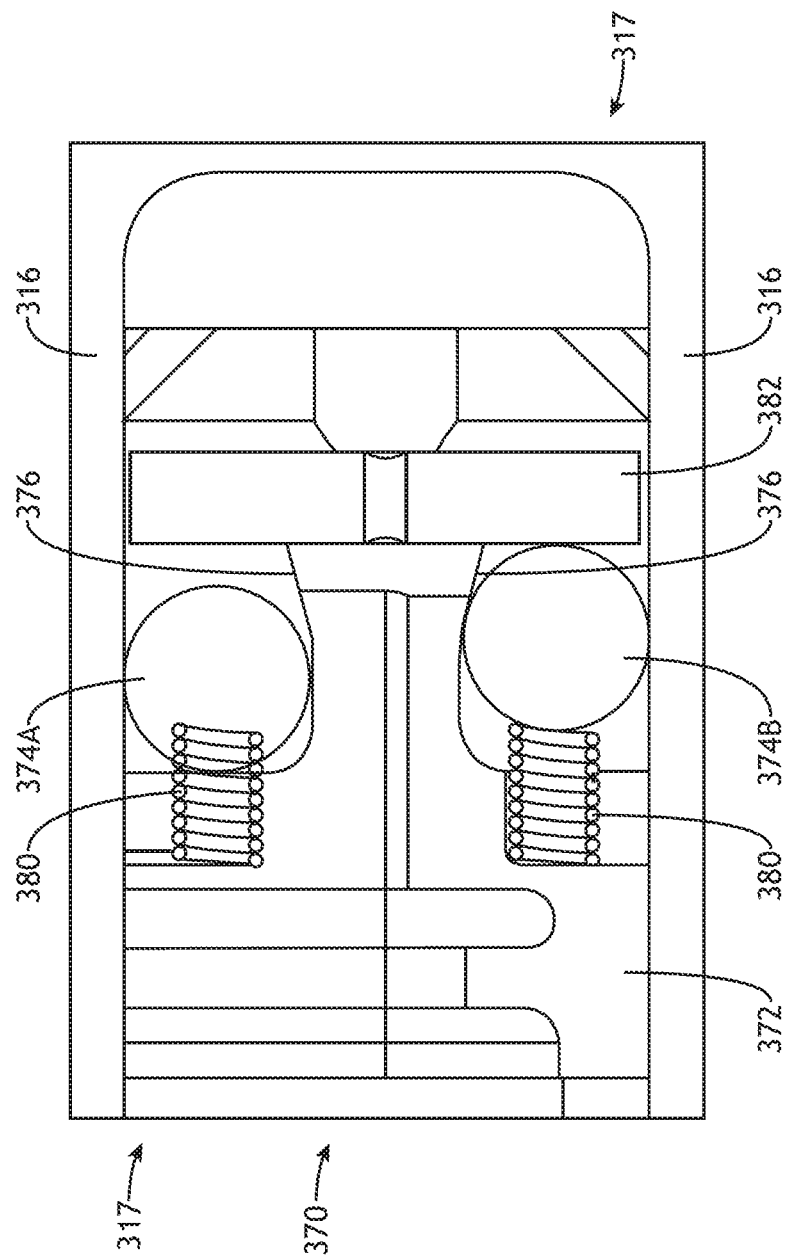
FIG. 10 is an enlarged side view of a brake, according to the present disclosure, of the jointed arm mechanism of FIG. 4.

As shown in FIG. 10, the brake block 372 has a pair of cylindrical brake rollers 374, each biased toward a respective ramp 376 by a respective captured spring 380. The springs press the rollers from their inward positions, at which the brake is in a released condition, toward the ramps. The ramps and springs cooperatively press the rollers 376 toward their extended positions, at which the brake is in a braking condition. Although in typical use the rollers operate cooperatively with both either in their inward or extended positions, for illustration purposes a roller 374A in FIG. 10 is shown in its inward position, with the corresponding spring being compressed, and the other illustrated roller 374B is shown in its extended position engaging the corresponding ramp and wall of the slot.

With the brake 370 is in the released condition with the rollers 374 in their inward positions (see the roller 374A in FIG. 10), the brake block 372 is free to travel longitudinally within the slot 317 thus permitting the center arm 310 to pivot the allowing the jointed arm mechanism 200 be adjusted. With the brake 370 in its braking condition with the rollers 374 in their extended positions (see the roller 374B in FIG. 10), the rollers are pressed outward by the ramps 376 to engage the walls of the slot thereby arresting or damping movement of the brake block 372 within the slot and relative to the side frame 316.

To control the brake 370, a pin 382 extends within the brake block 372 under passenger control to permit the rollers 374 to reach the extended positions and activate the braking condition. The pin 382 is actuated against the force of a biasing brake spring 384 (FIG. 11) to press the rollers 374 to their inward positions and release the brake when a passenger operates a handle 160, shown for example in the lower side of the table 150 in FIG. 3. A pull cable coupled to the pin 382 and handle 160 is routed, for example within a flexible fixed-length cable housing, through the table 150, lower arm 410, and center arm 210 to reach the brake 370.

To use the adjustable table assembly 100, a passenger can rotate the table 150 and jointed arm mechanism 200 from the stowed position. The table 150 can be unfolded from folded condition of FIG. 2, in which the second table section 154 is stacked over the first table section 152, to the condition of FIG. 3 in which the two table sections are side-by-side. The table 150 in the folded or unfolded condition can be slid forward relative to the lower arm 410, preparing the table 150 to be lowered by clearing the center arm 310 for pivoting relative to the upper arm 210. The handle 160 is used to release the brake 370, allowing the center arm 310 to pivot downward, while the table 150 is maintained as horizontal. Upon release of the brake 370, the counterbalance 360 (FIG. 5) biases the center arm 210 to pivot and lower the table 150. The handle 160 can be released to engage the brake 370 and fix the height of the table. At any selected table height, the passenger can move the table linearly along the lower arm rail 458, and the passenger can pivot the adjustable table assembly 100 about the rearward end 212 of the upper arm 210.

While the foregoing description provides embodiments of the invention by way of example only, it is envisioned that other embodiments may perform similar functions and/or achieve similar results. Any and all such equivalent embodiments and examples are within the scope of the present invention and are intended to be covered by the appended claims.

What is claimed is:

1. A table assembly, comprising:
a first arm attachable to a fixed structure;
a second arm pivotally attached to the first arm;
a third arm pivotally attached to the second arm; and
a table attached to the third arm,
wherein the second arm is configured to maintain the first arm and the third arm parallel as the first arm and the third arm pivot simultaneously relative to the second arm to raise or lower the table;
wherein the second arm comprises a tension member configured to transfer tension along the second arm from the first arm to the third arm as the first arm and the third arm pivot simultaneously relative to the second arm; and
wherein the second arm comprises a side frame pivotally attached to the first arm and pivotally attached to the second arm, and wherein the tension member moves linearly relative to the side frame when the first arm and the third arm pivot simultaneously relative to the second arm.

2. The table assembly of claim 1, wherein the second arm comprises a compression member configured to transfer compression along the second arm from the first arm to the third arm as the first arm and the third arm pivot simultaneously relative to the second arm.

3. The table assembly of claim 1, wherein the second arm further comprises a compression member configured to transfer compression along the second arm from the first arm to the third arm as the first arm and third arm pivot simultaneously relative to the second arm, and the compression member moves linearly relative to the side frame when the first arm and the third arm pivot simultaneously relative to the second arm.

4. The table assembly of claim 3, wherein the tension member and the compression member move linearly, relative to the side frame, in opposite directions simultaneously when the first arm and the third arm pivot simultaneously relative to the second arm.

5. The table assembly of claim 1, wherein the tension member is further configured to transfer compression along the second arm from the third arm to the first arm as the first arm and third arm pivot simultaneously relative to the second arm.

6. The table assembly of claim 1, wherein the tension member comprises a first contact surface engaging the first arm and a second contact surface facing the first contact surface and engaging the second arm.

7. The table assembly of claim 6, wherein the first contact surface is involute and the second contact surface is involute.

8. The table assembly of claim 6, wherein the first arm comprises a first rail engaging the first contact surface, the second arm comprises a second rail engaging the second contact surface, and the first rail and the second rail are trapped between the first contact surface and the second contact surface.

9. An aircraft passenger seat assembly, comprising:
a passenger seat; and
a table assembly, including:
a first arm attached to the passenger seat;
a second arm pivotally attached to the first arm;
a third arm pivotally attached to the second arm; and
a table attached to the third arm,
wherein the second arm is configured to maintain the first arm and the third arm parallel as the first arm and third arm pivot simultaneously relative to the second arm to raise or lower the table;
wherein the second arm comprises a tension member configured to transfer tension along the second arm from the first arm to the third arm as the first arm and the third arm pivot simultaneously relative to the second arm; and
wherein the second arm comprises a side frame pivotally attached to the first arm and pivotally attached to the second arm, and the tension member moves linearly relative to the side frame when the first arm and the third arm pivot simultaneously relative to the second arm.

10. The aircraft passenger seat assembly of claim 9, wherein the second arm comprises a compression member configured to transfer compression along the second arm from the first arm to the third arm as the first arm and the third arm pivot simultaneously relative to the second arm.

11. The aircraft passenger seat assembly of claim 9, wherein the second arm further comprises a compression member configured to transfer compression along the second arm from the first arm to the third arm as the first arm and third arm pivot simultaneously relative to the second arm, and the compression member moves linearly relative to the side frame when the first arm and the third arm pivot simultaneously relative to the second arm.

12. The aircraft passenger seat assembly of claim 11, wherein the tension member and the compression member move linearly, relative to the side frame, in opposite directions simultaneously when the first arm and the third arm pivot simultaneously relative to the second arm.

13. The aircraft passenger seat assembly of claim 9, wherein the tension member is further configured to transfer compression along the second arm from the third arm to the first arm as the first arm and third arm pivot simultaneously relative to the second arm.

14. The aircraft passenger seat assembly of claim 9, wherein the tension member comprises a first contact surface engaging the first arm and a second contact surface facing the first contact surface and engaging the second arm.

15. The aircraft passenger seat assembly of claim 14, wherein the first contact surface is involute and the second contact surface is involute.

16. The aircraft passenger seat assembly of claim 14, wherein the first arm comprises a first rail engaging the first contact surface, the second arm comprises a second rail engaging the second contact surface, and the first rail and the second rail are trapped between the first contact surface and the second contact surface.

* * * * *